US010573184B1

(12) United States Patent
Pandit et al.

(10) Patent No.: US 10,573,184 B1
(45) Date of Patent: Feb. 25, 2020

(54) MONITORING SECURITY THREAT DURING TRAVEL

(71) Applicant: International Business Machines Corporation, Armonk, NY (US)

(72) Inventors: Sushain Pandit, Austin, TX (US); Shikhar Kwatra, Durham, NC (US); Vittorio Castelli, Croton-on-Hudson, NY (US); Sarbajit K. Rakshit, Kolkata (IN)

(73) Assignee: Internatioinal Business Machines Corpoation, Armonk, NY (US)

( * ) Notice: Subject to any disclaimer, the term of this patent is extended or adjusted under 35 U.S.C. 154(b) by 0 days.

(21) Appl. No.: 16/199,292

(22) Filed: Nov. 26, 2018

(51) Int. Cl.
*G08G 1/00* (2006.01)
*G01C 21/34* (2006.01)
*G06Q 50/26* (2012.01)
*G06F 16/29* (2019.01)

(52) U.S. Cl.
CPC ......... *G08G 1/207* (2013.01); *G01C 21/3407* (2013.01); *G06F 16/29* (2019.01); *G06Q 50/265* (2013.01)

(58) Field of Classification Search
CPC .... G08G 1/207; G06F 16/29; G01C 21/3407; G06Q 50/265
USPC ....................................................... 340/992
See application file for complete search history.

(56) References Cited

U.S. PATENT DOCUMENTS

| | | | | |
|---|---|---|---|---|
| 6,363,323 | B1 * | 3/2002 | Jones ..................... | G06Q 10/08 340/989 |
| 7,076,365 | B2 * | 7/2006 | Tzamaloukas ......... | G01C 21/28 342/357.395 |
| 7,149,533 | B2 * | 12/2006 | Laird ....................... | A61B 5/04 455/456.3 |
| 8,898,010 | B2 * | 11/2014 | Modica .................. | G01C 21/20 701/466 |
| 9,245,396 | B2 | 1/2016 | Delong et al. | |
| 9,372,089 | B2 | 6/2016 | Bennah et al. | |
| 9,739,621 | B2 | 8/2017 | Modica et al. | |
| 9,743,234 | B2 | 8/2017 | Varoglu et al. | |
| 9,952,056 | B2 | 4/2018 | Khasis | |

(Continued)

FOREIGN PATENT DOCUMENTS

WO 2012034581 A1 3/2012

OTHER PUBLICATIONS

Derek, "How to Avoid Being Ripped Off by Taxi Drivers", Jan. 26, 2011, 55 pages, <hltp://www.wanderingearl.com/how-to-avoid-being-ripped-off-by-taxi-drivers/>.

(Continued)

*Primary Examiner* — John A Tweel, Jr.

(74) *Attorney, Agent, or Firm* — Monchai Chuaychoo

(57) ABSTRACT

An approach for notifying a passenger of a route deviation during travel. The approach includes calculating a passenger route deviation from a predicted travel route and comparing the passenger route deviation to a predefined threshold route deviation. The approach further includes providing the passenger a notification of a route deviation if the deviation exceeds a predefined route deviation threshold. In addition, the approach determines if the passenger acknowledged the route deviation notification within a predetermined time period and if the passenger fails to acknowledge the notification, then provides the notification to one or more third parties.

20 Claims, 6 Drawing Sheets

(56) References Cited

U.S. PATENT DOCUMENTS

| | | | |
|---|---|---|---|
| 10,212,570 B1* | 2/2019 | Ramalingam | H04W 4/70 |
| 2002/0128768 A1 | 9/2002 | Nakano et al. | |
| 2006/0276962 A1 | 12/2006 | Yoshioka et al. | |
| 2007/0276596 A1 | 11/2007 | Solomon et al. | |
| 2010/0332118 A1* | 12/2010 | Geelen | G01C 21/32 |
| | | | 701/533 |
| 2011/0112747 A1 | 5/2011 | Downs et al. | |
| 2016/0202073 A1 | 7/2016 | Claycomb et al. | |
| 2017/0370735 A1 | 12/2017 | Salowitz | |

OTHER PUBLICATIONS

Nassi et al., "Virtual Breathalyzer", arXiv:1612.05083v1 [cs.HC], Dec. 14, 2016, 10 pages, <https://arxiv.org/pdf/1612.05083.pdf>.

"Road Conditions", Driving Difficulty Index, printed Jul. 31, 2018, 1 page, <http://www.theweathercompany.com/sites/default/files/styles/adaptive/public/images/road_conditions_landing.jpg?itok=KEc3P3_1) >.

"DWR Dynamic Weather Routes", National Aeronautics Space Administration, Jun. 21, 2017, 5 pages, <https://www.aviationsystems.arc.nasa.gov/research/strategic/dwr.shtml>.

Razak et al., "A Real-Time deviation detection and vector measurement technique for straight line quadrocopter navigation using accelerometer", IEEE Xplore Digital Library, 2014 IEEE 5th Control and System Graduate Research Colloquium, Sep. 25, 2014, 2 pages, <https://ieeexplore.ieee.org/document/6908698>.

Sharma, Kirti, "RideSafe—A Mobile App Which Can Sense Trouble Even Before You Can", IndianWeb2, 9 pages, <https://www.indianweb2.com/2015/05/07/ridesafe-a-mobile-app-which-can-sense-trouble-even-before-you-can/>.

"First REAL Travel Safety App!", RideSafe, copyright 2015, 4 pages, <https://ridesafeapp.com/>.

Razak et al., "A Real-Time Deviation Detection and Vector Measurement Technique for Straight Line Quadrocopter Navigation Using Accelerometer", IEEE Xplore Digital Library, 2014 IEEE 5th Control and System Graduate Research Colloquium, Aug. 11-12, UiTM, Shah Alam, Malaysia, <https://ieeexplore.ieee.org/document/6908698>, 6 pages.

* cited by examiner

MONITORING SECURITY THREAT DURING TRAVEL

BACKGROUND OF THE INVENTION

The present invention relates generally to the field of navigation data communication, and more particularly to systems and methods for detecting a security threat to a passenger during travel.

In many situations, passengers must blindly trust other individuals to provide services. For example, a passenger arriving at an airport is very tired, and takes a taxi from the airport to a destination. After entering the taxi, the passenger falls asleep before arriving at the destination. While sleeping in the taxi, the passenger is unaware the taxi driver is taking a non-optimal or inappropriate route to the destination. In another example, the taxi driver takes the passenger to an undesired location. Alternatively, as autonomous vehicles become ubiquitous as a means of transportation, a passenger would be unaware of a failure in the autonomous vehicle to calculate an appropriate route for the specified destination, possibly exposing the passenger to excessive charges.

SUMMARY

Embodiments of the present invention disclose a method and a computer system for monitoring and notifying passengers of route deviation during a trip. The method may include one or more computer processors receiving a request from a passenger to monitor a travel route from a present location to a destination; calculating a passenger route deviation from the travel route; comparing the passenger route deviation to a predefined threshold route deviation; responsive to the passenger route deviation exceeding the predefined threshold route deviation, notifying the passenger of a route deviation alarm; determining if the passenger acknowledged the route deviation alarm within a predetermined time period; responsive to the passenger not acknowledging the route deviation alarm, notifying one or more third parties of the passenger's route deviation alarm.

According to another embodiment, the computer system monitors and notifies passengers of a route deviation during a trip. The computer system may include: one or more computer processors; one or more computer readable storage devices; and program instructions stored on the one or more computer readable storage devices for execution by at least one of the one or more computer processors, the stored program instructions comprising: program instructions to receive a request from a passenger to monitor a travel route from a present location to a destination; program instructions to calculate a passenger route deviation from the travel route; program instructions to compare the passenger route deviation to a predefined threshold route deviation; responsive to the passenger route deviation exceeding the predefined threshold route deviation, program instructions to notify the passenger of a route deviation alarm; program instructions to determine if the passenger acknowledged the route deviation alarm within a predetermined time period; responsive to the passenger not acknowledging the route deviation alarm, program instructions to notify one or more third parties of the passenger's route deviation alarm.

DETAILED DESCRIPTION

Embodiments of the present invention recognize that electronic devices can improve a passenger's travel safety based on detecting security threats and proactively sending notifications to the passenger or to other individuals identified by the passenger.

Embodiments of the present invention can be realized by the use of a smart system capable of monitoring a passenger in a vehicle to provide safe passage to a destination. For example, a passenger's mobile device can alert the passenger if the route taken by the driver of the vehicle (e.g., autonomous or non-autonomous vehicle) exceeds a predetermined threshold deviation. The mobile device can send a textual notification about the change in route (i.e., threshold deviation from the route). A threshold deviation from the route can be, for example, the driver has selected a longer route, hence more monetary charge, or the driver has selected an unauthorized destination for unknown reasons.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments are intended to be illustrative, and not restrictive. Further, the figures are not necessarily to scale, the description may exaggerate some features to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment," "an embodiment," "an example embodiment," etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments, whether or not explicitly described.

Figure 1:
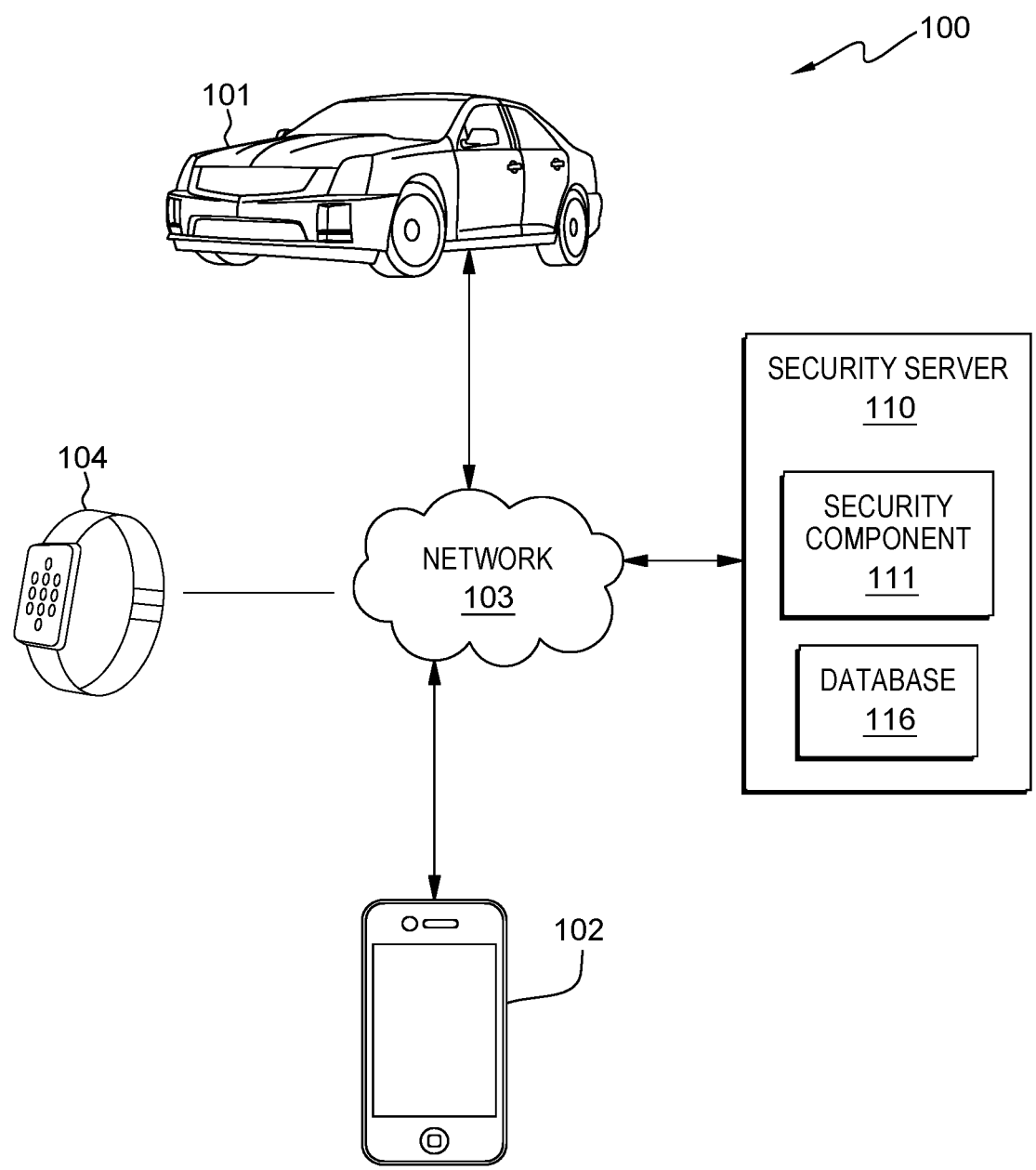
FIG. 1 is a functional block diagram illustrating a travel security threat detecting environment 100, in accordance with an embodiment of the present invention.

FIG. 1 is a functional block diagram illustrating a travel security threat detecting environment 100, in accordance with an embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Travel security threat detecting environment 100 includes vehicle 101, mobile device 102, sensor 104, and security server 110, all interconnected over network 103.

Vehicle 101 in the present embodiment is the vehicle utilized by a passenger. Vehicle 101 can be a multi-wheel vehicle (e.g., passenger cars, bus, etc.). Vehicle 101 can also be a vehicle without any wheels and may rely on other methods of propulsion (e.g., magnetic, etc.).

Mobile device 102 can be a mobile computing device, or any other electronic device or computing system capable of receiving, sending, and processing data. Mobile device 102 allows the passengers to access security component 111 on security server 110.

Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice and/or video signals, including multimedia signals that include voice, data and video information. In general, network 103 can be any combination of connections and protocols that can support communications between security server 110, mobile device 102, sensor 104 and other computing devices (not shown) within travel security threat detecting environment 100.

Sensor 104 represents one or more sensors enabling tracking and monitoring of a passenger. In the depicted embodiment, sensor 104 is a wearable device. In another embodiment, sensor 104 can be a secondary computing device (not shown) within travel security threat detecting environment 100. In an embodiment, sensor 104 includes an optical sensor enabling, eye, facial, hand, and head tracking of a passenger. Generally, eye, facial, hand and head tracking utilize a non-contact, optical method for measuring body motion and body features of a passenger. In a further embodiment, sensor 104 can include a cognitive state recognition system measuring distinct features of the face such as eyes, nose and mouth. The cognitive state recognition system can determine certain moods of the passenger based on facial expressions. For example, sensor 104 detects a smile on the passenger and concludes the passenger is happy. Alternatively, sensor 104 detects a frown on the passenger and concludes the passenger is frightened or unhappy. In yet another embodiment, sensor 104 can include devices for detecting various frequencies of the electromagnetic radiation spectrum such as near-field communication (NFC) and Bluetooth®. For example, sensor 104 can communicate via Bluetooth with implantable bio devices (e.g., glucose monitoring, etc.). In yet another embodiment, sensor 104 can include devices that detect physiological changes such as a heart rate monitor and motion tracker. In another embodiment sensors 104 can include position tracking utilizing existing technology as Global Positioning System (GPS) and wireless cell tower.

Security server 110 can be a standalone computing device, a management server, a web server, a mobile computing device, or any other electronic device or computing system capable of receiving, sending, and processing data. In other embodiments, security server 110 can represent a server computing system utilizing multiple computers as a server system, such as in a cloud computing environment. In another embodiment, security server 110 can be a laptop computer, a tablet computer, a netbook computer, a personal computer (PC), a desktop computer, a personal digital assistant (PDA), a smart phone, or any other programmable electronic device capable of communicating other computing devices (not shown) within the travel security threat detecting environment 100 via network 103. In another embodiment, security server 110 can represent a computing system utilizing clustered computers and components (e.g., database server computers, application server computers, etc.) acting as a single pool of seamless resources when accessed within travel security threat detecting environment 100. In general, security server 110 can provide the ability to monitor, detect, track and notify passenger of threshold deviations in their travels. It should be noted that Security server 110 includes security component 111 and database 116.

Security component 111 can provide the capability of monitoring the predicted route of the passenger (i.e., predicted travel route) versus the actual route (i.e., current passenger travel route) taken by a vehicle associated with the passenger, detecting a predetermined threshold deviation from the predicted route, and alerting the passenger, or proxies preselected by the passenger, of the threshold deviation from the predicted route. It should be noted the predetermined threshold deviation can be based on various parameters (e.g., weather, traffic patterns, construction, etc.). Furthermore, security component 111 can learn the behavioral characteristics (including the cognitive state) of the passenger while traveling (e.g., current route or past travels, etc.) or learn from other passengers regarding similar routes to ensure the safety of the passenger during travel.

Database 116 is a repository for data used by access security component 111. Database 116 can be implemented with any type of storage device capable of storing data and configuration files that can be accessed and utilized by security server 110, such as, but not limited to, a database server, a hard disk drive, or a flash memory. Database 116 uses one or more of a plurality of techniques known in the art to store a plurality of information. In the depicted embodiment, database 116 resides on security server 110. In another embodiment, database 116 may reside elsewhere within travel security threat detecting environment 100, provided that security component 111 has access to database 116. Database 116 can store information associated with the passenger's past travel routine. For example, Joe, a consultant, who spends most of his time at various cities of his clients, has extensive travel habits and routines that can be stored, such as Joe's preferred mode of transportation from the airport to the hotel of a particular city or Joe's habit of dozing off in warm climates while traveling from the hotel to the airport. Furthermore, database 116 can store information associated with a passenger's routine route to a hotel based on historical and crowd source data for the same trip route. For example, Joe's trip from Denver's airport to a famous hotel chain is well documented and tracked by prior passengers on similar trips. All this information can be stored by database 116.

Figure 2:
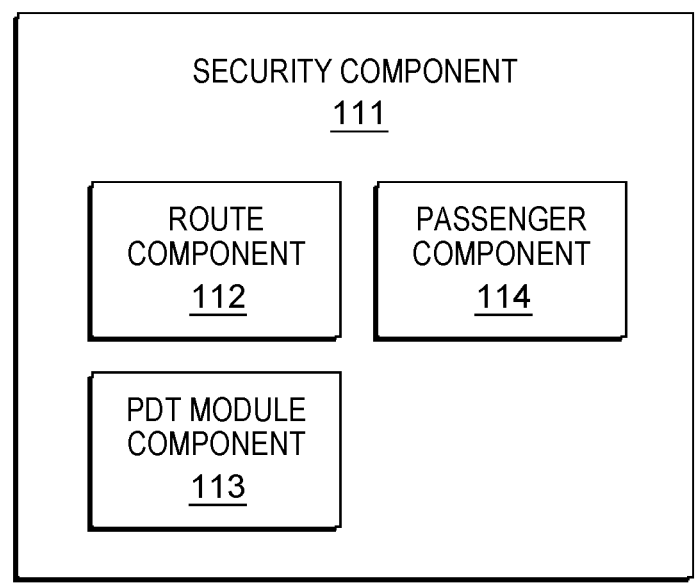
FIG. 2 is a functional block diagram illustrating individual components of security component 111 associated with a travel security threat detecting environment 100 in accordance with an embodiment of the present invention.

FIG. 2 is a functional block diagram illustrating the individual components of security component 111 residing in travel security threat detecting environment 100 in accordance with an embodiment of the present invention. Security component 111 includes route component 112, Permissible Deviation Threshold (PDT) module component 113, and passenger component 114.

Route component 112 provides the capability of tracking the passenger's location and the predicted route to the destination. In addition, route component 112 can gather traffic-related and weather-related information along the route. It is noted that the source for route component 112 can be an emergency broadcast (e.g., weather emergency) system or from online data (e.g., traffic websites, weather-related websites, etc.).

PDT module component 113 provides the capability of analyzing and comparing the passenger's location against the predicted route. Additionally, PDT module component 113 can calculate the predicted route based on data from route component 112 and/or passenger component 114. PDT module component 113 dynamically adjusts a predetermined threshold based on various conditional parameters (e.g., traffic conditions, road conditions, weather conditions, etc.) and compares the threshold against the passenger's deviation from the predicted route. Based on the passenger's route against the threshold, PDT module component 113 can recognize deviation from the predicted route by the vehicle. If one or more of the conditional parameters is/are suboptimal, the system/other components of security component 111 can consult PDT module component 113 to determine the current "threshold of permissible deviation" from the predicted route. The "threshold of permissible deviation" is defined as a numerical value that is acceptable by the passenger for the current route to deviate from the predicted route. For instance, if the traffic conditions are icy and the driver can take a slightly longer route if it's anticipated to be safer (e.g., lower incline in icy conditions) then the threshold of permissible deviation can be acceptable (i.e., safe). The "predicted route" can be defined as the shortest and/or fastest route from the original location (e.g., passenger current location at the start of the trip, starting destination, any location deemed to begin the trip, etc.) to the intended destination.

PDT module component 113 can receive information from other components (e.g., route component 112 and passenger component 114) and analyze the received information during the travel. For example, if one or more of the conditional parameters (e.g., traffic, road conditions, etc.) are impacting the route, security component 111 can consult PDT module component 113 to determine and calculate the current "threshold of permissible deviation" from the predicted route. Furthermore, if the calculated PDT is above a certain threshold then security component 111 can take certain actions (e.g., notify authority, alert passengers, etc.). The calculated PDT value is dynamically adjustable. It can be adjusted by the passenger and/or security server system (i.e., through a self-learning process).

Furthermore, PDT module component 113 can be initialized and trained to recognize certain permissible deviation thresholds to a fixed value for a specific set of conditions during initial system deployment. For instance, during initial system deployment, a threshold of permissible deviation may be initialized to a value such that a driver can deviate within a radius of 5 miles when road conditions are icy (e.g., quantified as "5") and when a traffic congestion factor is above 10. These conditional quantifications can be based on a pre-determined scale. Several such conditions that are greater than the threshold instances can be pre-determined. Some embodiments may have multiple thresholds of permissible deviations (e.g., radius from route, time to destination, directional changes from the predicted route, increase or decrease in speed of the vehicle during travel, etc.). Some embodiments may rely on multiple parameters to establish how permissible deviation condition is defined. For example, icy weather and heavy traffic conditions can be inferred as a permissible deviation condition at an index of 5. For this index of 5, a different set of thresholds of permissible deviation might be applied based on a specific given condition. Based on a training set, a model can be trained to learn these associations such that given a new set of conditions, it can determine a reasonable threshold.

Additionally, the threshold of permissible deviation from the predicted route, can be learned and improved over several iterations (i.e., drives) per feedback and retraining. At system deployment, the threshold of permissible deviation is based on the initial trained model from the prior iteration. For example, after feedback from "t" different passengers that the app was incorrectly notifying them (i.e., false positives) when the driver was varying from the predicted route, e.g., outside of the 5-mile radius, because of icy conditions, PDT module component 113 re-adjusts the threshold value and raises the threshold to "n"+"t"*w, where "w" is a normalizing factor for passenger feedback and where "n" is the initial threshold value. It should be noted that "w" can be set to a value based on various passenger profiles (e.g., can default to 0.1). So, for instance, if 50 different passengers provide feedback that the driver wasn't really trying to leave the predicted route but was just avoiding icy conditions, PDT module component 113 may update the threshold to 5+50*0.1=10 miles for those set of conditions as reported by the passengers. Similarly, for opposite feedback, PDT module component 113 may reduce the radius to 3 miles if enough passengers provide feedback that the threshold was too permissive. Based on this re-labelled set, PDT module component 113 re-trains its model to re-learn the conditions based on the threshold relationships. Some embodiments may have multiple thresholds of permission deviations (e.g., radius, time to destination, directional changes from predicted route, change in speed, etc.). For example, threshold such as a reduction in speed (e.g., change in speed) by the vehicle when there is no traffic or weather-related issues on the route may trigger deviation and may not be permissible.

Passenger component 114 of embodiments of the present invention provides the capability of understanding a passenger cognitive state (e.g., moods, etc.) and historical patterns (e.g., behaviors, propensity, habits, etc.) of the passenger. A camera of sensor 104 or mobile device 102 can analyze facial expressions of the passenger to determine the passenger's mood. For example, passenger component 114 through sensor 104 can recognize when the passenger is sleeping or scared during the ride. Furthermore, passenger component 114 can analyze conversations of the passenger to ascertain the passenger's cognitive state. For example, a heighten pitch in a voice can indicate stress or duress. Passenger component 114 can store and retrieve data regarding the cognitive state of the passenger from database 116. Furthermore, passenger component 114 can recall the habit of the passenger during a past trip. For example, Joe enjoys napping in the vehicle from the airport to the hotel. Passenger component 114 can store historical activity of a passenger including, but not limited to, calendar (i.e., activity schedule) of the passenger, flight and travel information, and social media postings.

Figure 3:
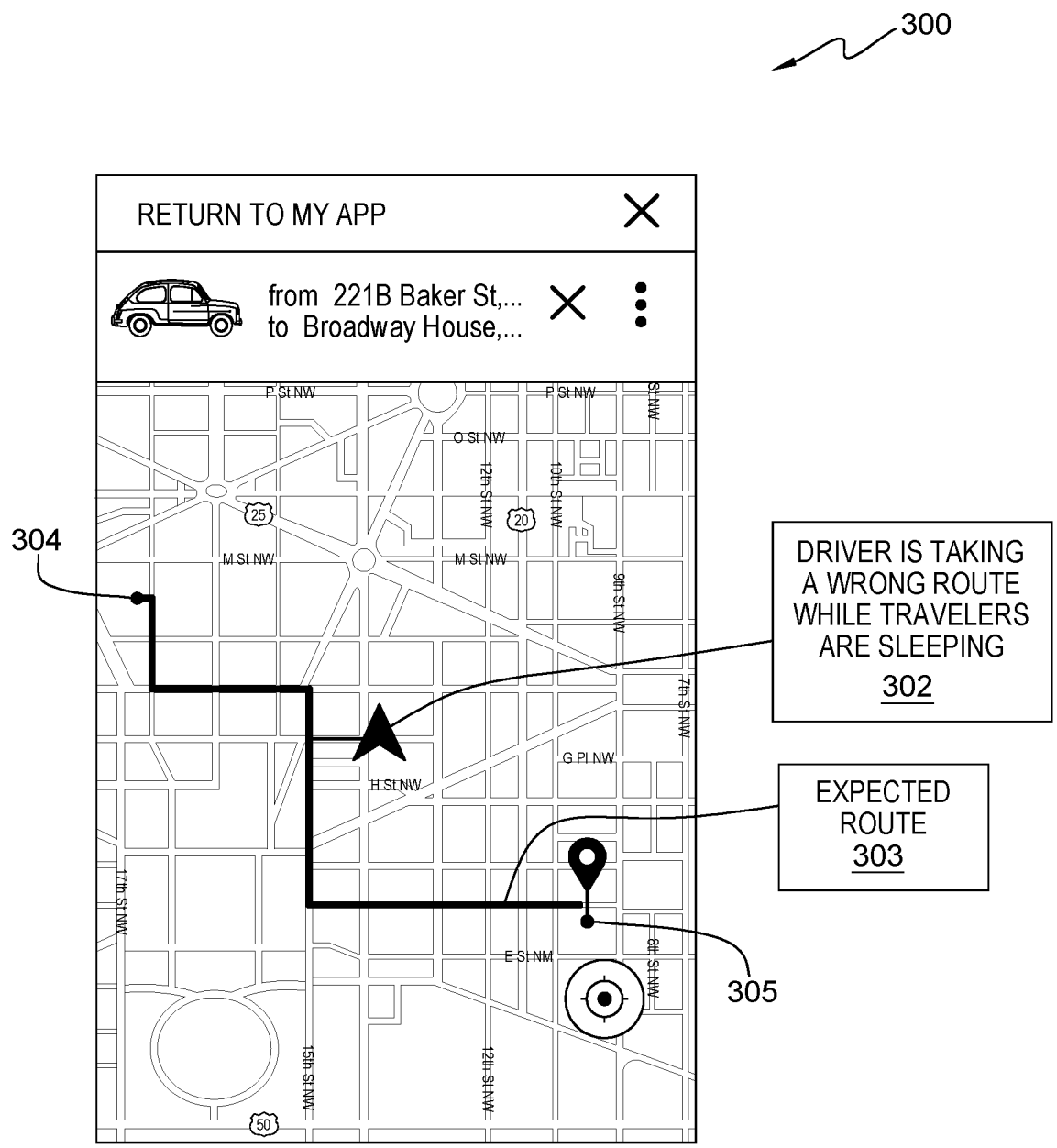
FIG. 3 is example output 300 from security component 111 on a mobile device, in accordance with an embodiment of the present invention.

FIG. 3 is an example screenshot of the software interface running security component 111 on a mobile device in accordance with an embodiment of the present invention, designated as screenshot travel environment 300. Screenshot travel environment 300 includes deviation point 302, expected route 303, start point 304 and final destination 305. Screenshot travel environment 300 shows the software interface of expected route 303 superimposed on the actual route. Start point 304 is the starting origination of the trip. For example, passenger hailed a taxi at the airport (i.e., start point 304) and is trying to get to final destination 305 (i.e., hotel). However, the driver of the taxi took a different route while the passenger is sleeping as indicated by deviation point 302.

Figure 4:
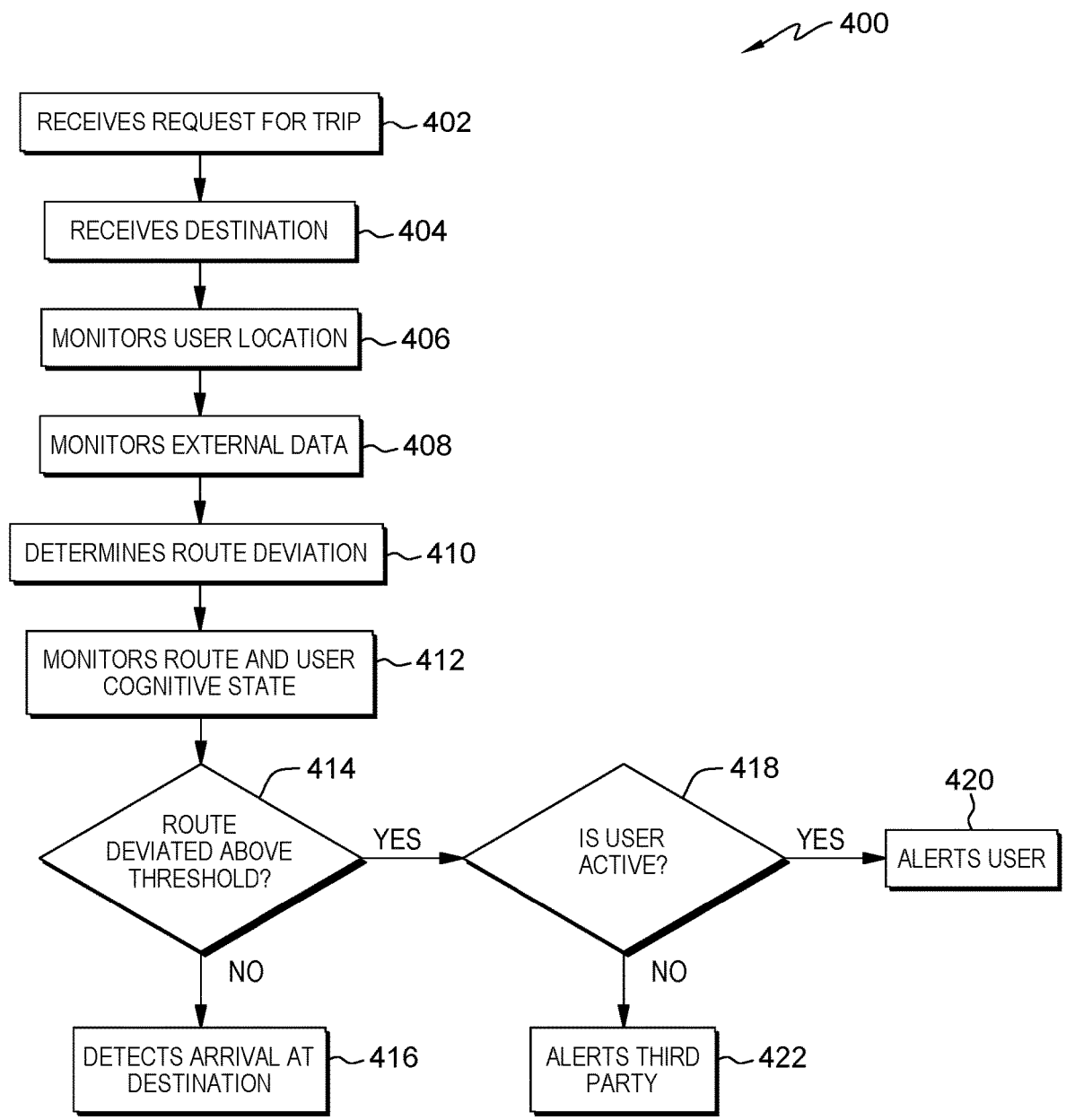
FIG. 4 is a flowchart 400 depicting the operational steps of security component 111, in accordance with an embodiment of the present invention.

FIG. 4 is a flowchart depicting the operational steps of security component 111, in accordance with an embodiment of the present invention.

Security component 111 receives a request for the trip (step 402). In an embodiment, a passenger invokes security component 111 by opening an application. For example, the passenger hails a ride, enters vehicle 101 and opens the application on mobile device 102. The passenger presses the start feature of the application to request the start of the trip. In another embodiment, the use of security component 111 is invoked automatically without passenger interaction. For example, in an embodiment where a cab driver and the passenger have previously opted-in to being audio recorded, voice enabled mobile device 102 will be able to detect if the passenger is taking a cab service for commuting from a source to a destination based on hearing a conversation between the cab driver and the passenger.

Security component 111 receives the destination of the trip (step 404). In an embodiment, the passenger inputs the destination into the application. The destination can be a static destination (e.g., hotel address, bus stop etc.) or a dynamic destination (e.g., just follow another car, take me to a less crowded restaurant). For example, after hailing the cab, the passenger inputs the destination of the trip on the application associated with security component 111. Based on the identified travel destination, mobile device 102 creates a route from the passenger's current location to the destination. In another embodiment, security component 111 can determine the destination automatically based on external data from mobile device 102 and/or sensors 104. For example, an application installed in the passenger's mobile device 102 can gather various sources of information to determine if the destination and/or route is familiar to the passenger. Further, historical travel data can be analyzed to determine if the passenger knows the route. For example, historical travel data can be retrieved from database 116. Mobile device 102 and/or sensors 104 associated with a wearable device can identify the destination of the passenger. In this case, the devices can gather the voice-based conversation and store data related to the travel destination, such as, but not limited to, a hotel address stored in the mobile device 102.

Security component 111 monitors the location of the passenger (step 406). In an embodiment, security component 111 determines the location of the passenger before and during the trip. For example, security component 111 can use the GPS location of mobile device 102 or sensors 104.

Security component 111 monitors external data (step 408). In an embodiment, security component 111 can gather external data before and during the trip that will support trip safety. For example, security component 111 through route component 112 can retrieve information regarding the driver of the vehicle. The driver's information can be retrieved from a cloud database associated with the system to verify if the driver's history is acceptable. In another embodiment, security component 111 through route component 112 can retrieve the current road conditions (e.g., weather conditions and traffic conditions) from public databases.

Security component 111 determines the route deviation (step 410). In an embodiment, security component 111 through PDT module component 113 calculates the route deviation from the predicted route. As previously mentioned, the threshold of permissible deviation from the predicted route can be learned and improved over several iterations. For instance, at system deployment, a threshold of permissible deviation can be initialized to a value allowing a driver to deviate within a predetermined radius of 5 miles from the predicted route. After feedback from a predetermined number of different passengers that they were incorrectly notified of a deviation (false positives) because the driver was exceeding the allowed deviation based on icy conditions, security component 111 can raise the threshold of permissible deviation to 7 miles. It is noted that the predetermined radius of 5 miles can be too long for a city scenario where a route deviation can be 500 feet or less. Therefore, the threshold of permissible deviation can be initialized to a value based on the geographic location. For example, a deviation of 5 miles can be acceptable for a trip from Atlanta to Miami. However, 5 miles is not an acceptable deviation for a trip from Madison Square Garden to Time Square in New York City. Similarly, security component 111 may reduce the radius to 3 miles if enough passengers provide feedback that the threshold was excessive. Mobile device 102 can determine if the driver is following the predicted route. For example, the driver has exceeded the permissible deviated value from the predicted travel route, which has high traffic, to an alternate route with less traffic. It is noted that security component 111 can also monitor driver's behavior to predict a security threat. For instance, if there is no traffic on the road, but the driver has slowed the vehicle, any contextually unexplained behavior can be identified, and notification provided to the passenger. It is noted that route deviations can occur based on, but not limited to, accidents, traffic patterns, weather conditions and construction along the predicted route and would not trigger a notification by security component 111.

Security component 111, through route component 112, monitors the predicted route and cognitive state of the passenger (step 412). For example, route component 112 dynamically calculates the predicted route based on various data (e.g., weather condition, traffic conditions, etc.) to ensure that the passenger is traveling towards the intended destination. In the same embodiment, security component 111 through passenger component 114 continuously monitors the cognitive state of the passenger during the trip. For example, sensors 104 or sensors on mobile device 102 will detect if the passenger is sleeping.

Security component 111 determines whether the passenger has exceeded the predetermined deviation from the predicted route (decision block 414). In an embodiment, security component 111 through PDT module component 113 calculates a deviation value (i.e., deviated value) by comparing the passenger's current location to the predicted travel route. If the deviation value is greater than the threshold ("YES" branch, decision block 414) then security component 111 determines the cognitive state of the passenger (decision block 418). However, if the deviation value is less than the threshold ("NO" branch, decision block 414) then security component 111 proceeds to determine the current location against the final destination (step 416). It is noted that the predefined threshold is passenger selectable and can be dynamically adjusted.

Security component 111 detects that the passenger arrives at the destination (step 416). In an embodiment, security component 111 detects that the passenger has arrived at the intended destination and can discontinue monitoring the passenger.

Security component 111 determines the cognitive state of the passenger (decision block 418). In an embodiment, security component 111 through passenger component 114 determines the cognitive state of the passenger. For example, passenger component 114 can determine whether the passenger is attentive to mobile device 102. If security component 111 determines that the passenger is not attentive towards the route of the vehicle, then either mobile device 102 or sensors 104 can alert the passenger. The passenger can validate with security component 111 that the vehicle is taking the predicted route to reach the destination within a predefined alert response time. For example, the passenger can be required to confirm the route deviation. Otherwise, security component 111 can deem the predicted route deviation threshold was exceeded. It is noted that the predefined alert response time can be passenger selectable and can be adjusted dynamically.

Security component 111 alerts the passenger (step 420). In an embodiment, security component 111 alerts the passenger that the route has deviated from the intended destination. For example, the passenger can be alerted with a haptic effect in conjunction with an appropriate message, such as, but not limited to, "A better route was available with respect to the specified destination." Mobile device 102 can alert the passenger if the predicted route is not followed by the driver. In one example, mobile device 102 can send a textual notification that the passenger's deviation from the predicted route has exceeded the allowable threshold. In another example, an alarm from sensor 104 can alert the passenger and an employer of the taxi service administrative staff at the ride sharing service if the driver is deviating from the predicted route while the passenger is unattentive.

Security component 111 can alert one or more third parties (step 422). In an embodiment, security component 111 can alert one or more third parties with one or more messages. For example, in an embodiment where the passenger has opted-in to law enforcement notification, if the mobile device identifies the current route has exceeded the deviation threshold, then a nearby local law enforcement authority (e.g., police, etc.) will also be informed about the deviation. The alert message can include the current location of the passenger, information related to the driver, or vehicle identification information (e.g., license plate, VIN, color, etc.). The local authorities and/or the passenger can be informed in a proactive manner if the route followed by the vehicle is deviating from the predicted route. If the deviation between the predicted route and actual route is more than the specified threshold limit, then the local authorities can be informed. The local authorities can be determined based on the last known GPS location of the passenger. It is noted that security component 111 can be set to alert any other individuals from a predetermined and dynamically adjustable list wherein either the passenger or the system can adjust the list (e.g., learning the habits of the passenger based on call list). For example, this list may include family members, relatives and non-related individuals (e.g., best friend, etc.).

Figure 5:
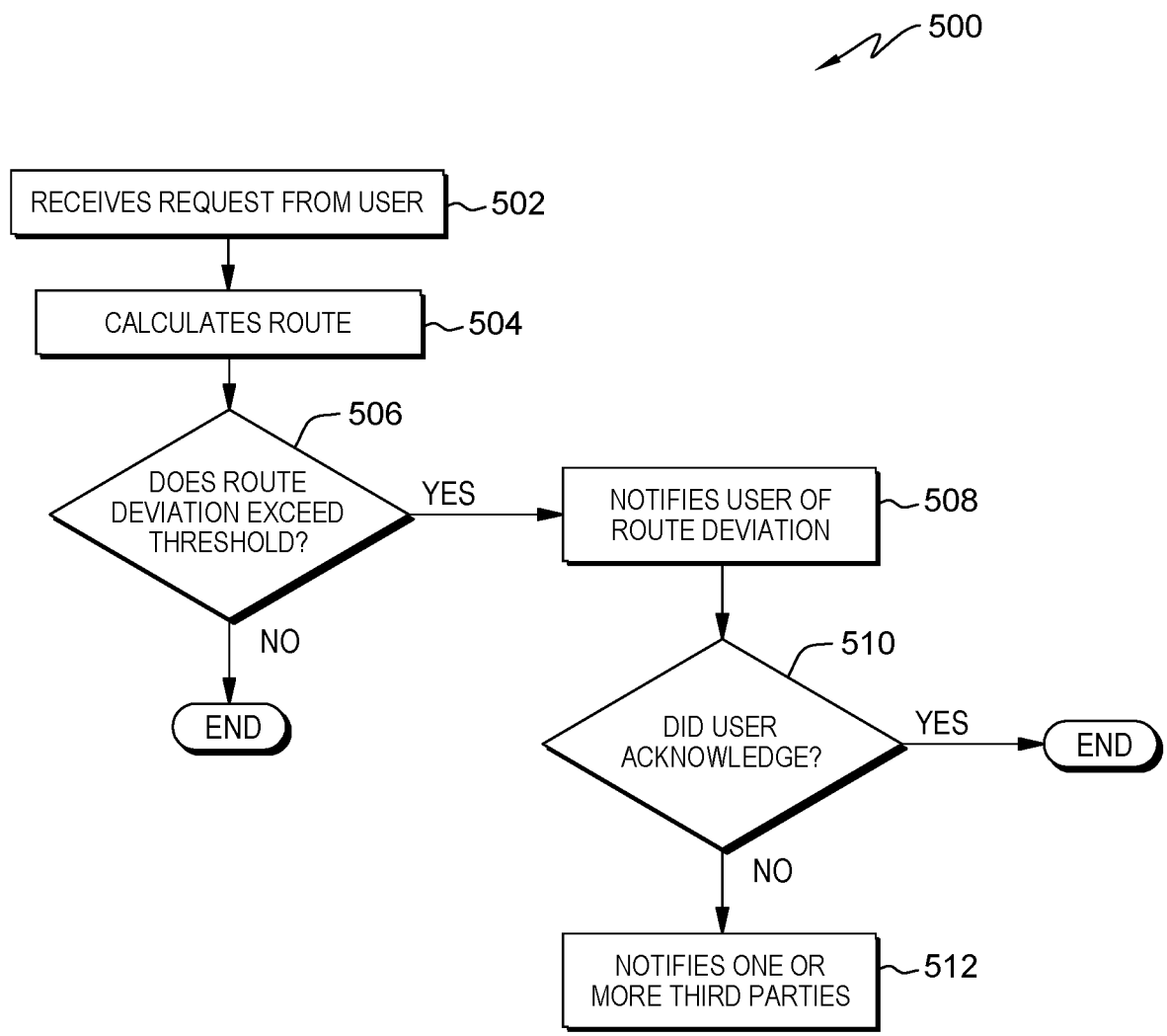
FIG. 5 is a flowchart 500 depicting the operational steps of security component 111, in accordance with an alternative embodiment of the present invention.

FIG. 5 is a flowchart depicting the operational steps of monitoring security travel component in accordance with another embodiment of the present invention.

Security component 111 receives a request from a passenger (step 502). In an alternate embodiment, the use of security component 111 can be invoked automatically without passenger interaction. For example, security component 111 can detect if the passenger is interacting with a ride sharing service based on the passenger entering a destination into a ride-sharing application.

Security component 111 calculates a predicted route (step 504). In an alternate embodiment, security component 111 through PDT module component 113 calculates a predicted route for a trip.

Security component 111 calculates a route deviation against a threshold (decision block 506). In an alternate embodiment, security component 111 through PDT module component 113 calculates the route deviation value against the predicted route and compares the calculated deviation value against a predefined threshold. If security component 111 determines the deviation value exceeds the threshold ("YES" branch, decision block 506), then security component 111 notifies the passenger of the deviation (step 508). Otherwise ("NO" branch, decision block 506), security component 111 continues monitoring the passenger location until the passenger has reached the destination.

Security component 111 notifies the passenger of the route deviation (step 508). In an alternate embodiment, security component 111 notifies the passenger via the application on mobile device 102 or sensors 104 that the vehicle 101 has deviated from the predicted route. It is noted that deviation from the predicted route may include factors such as distance from the predicted route or reduction or increase in speed of vehicle 101. For example, a reduction in vehicle 101 speed where there are no detectable reasons, e.g., heavy traffic, inclement weather, etc., may indicate a notification event for the passenger.

Security component 111 requires passenger acknowledgment of the notification (decision block 510). In an alternate embodiment, security component 111 requests acknowledgement from the passenger of the deviated route notification to verify the passenger is aware of the notification (i.e., cognitive state is attentive). For example, the passenger may be required to tap an acknowledgement button on mobile device 102. In another embodiment, the cognitive state passenger of the passenger may be ascertained as a form of acknowledgement from sensors 104 or the camera on mobile device 102. For example, the biometrics reading from sensors 104 may indicate that the passenger is awake and should understand the deviation notification. In another example, cameras from mobile device 102 can detect the facial features of the passenger to determine if the passenger is awake and aware of the notification. If security component 111 does not receive or determine an acknowledgement from the passenger ("NO" branch, decision block 510), then security component 111 notifies one or more third parties (step 512). However, if the passenger acknowledges the notification ("YES" branch, decision block 510), then security component 111 continues monitoring the route deviation until the passenger reaches the destination. It is noted that a positive acknowledgement from the passenger can include certain facial features such as smiling. Inversely, a negative acknowledgement from the passenger can include a "frown" or "scared" facial expression made by the passenger.

Security component 111 notifies one or more third parties of the route deviation (step 512). In an alternate embodiment, security component 111 can notify one or more third parties from a predetermined list provided by the passenger. The list can be stored in database 116 and can be dynamically adjusted by the passenger. For example, the list can include but it is not limited to, relatives, friends and local law enforcement.

Figure 6:
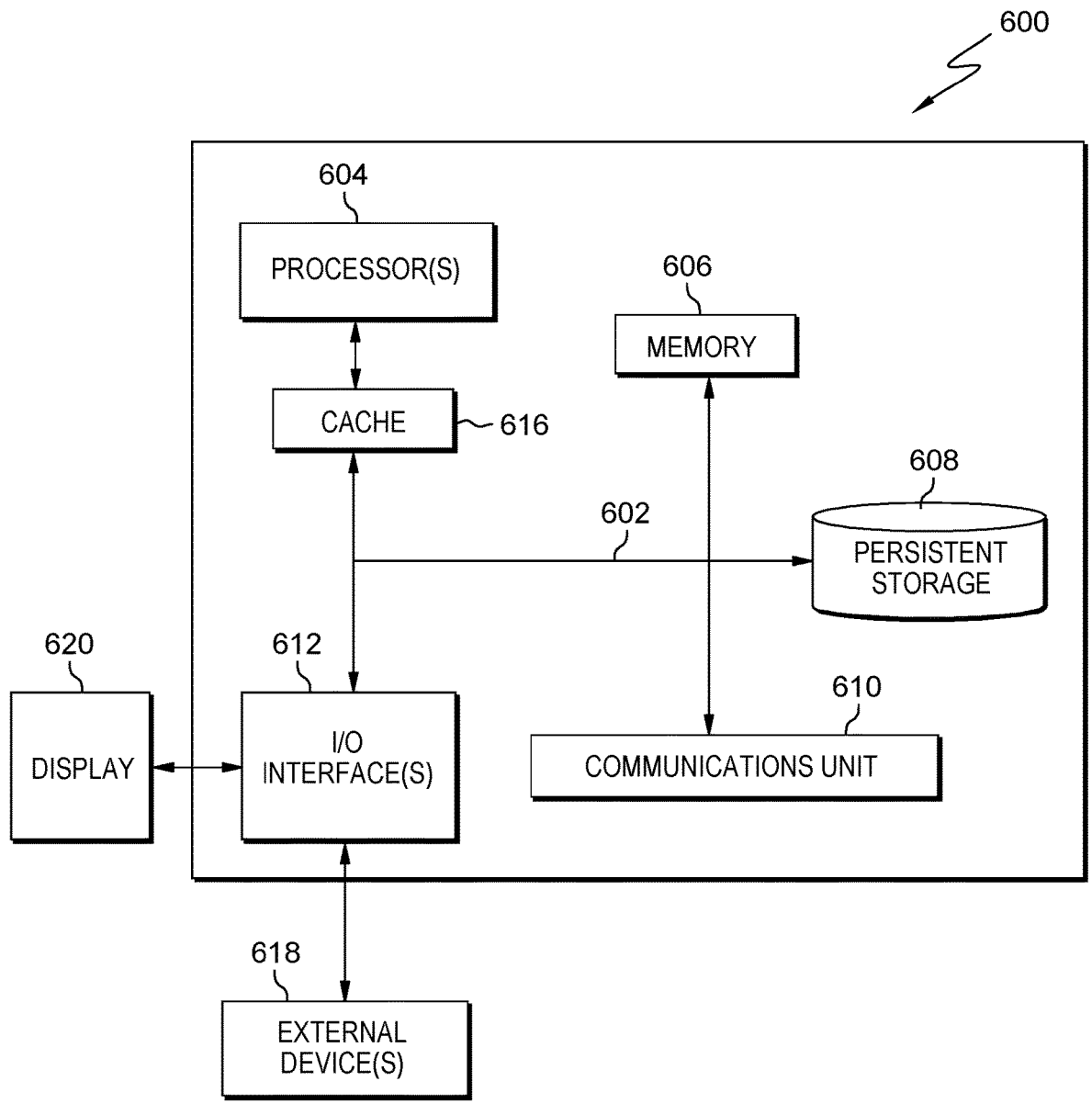
FIG. 6 depicts a block diagram 600 of components of a computing device capable of operating within the travel security threat detecting environment 100, in accordance with an embodiment of the present invention.

FIG. 6 depicts a block diagram, designated as 600, of components of the server computer executing the program within the travel security monitoring environment, of FIG. 1, in accordance with an embodiment of the present invention.

Security server 110 can include processor(s) 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processor(s) 607 by holding recently accessed data, and data near recently accessed data, from memory 606.

Program instructions and data used to practice embodiments of the present invention, e.g., security component 111 and database 116, can be stored in persistent storage 608 for execution and/or access by one or more of the respective processor(s) 607 of security server 110 via memory 606. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of mobile device 102, security server 110. In these examples, communications unit 610 includes one or more network interface cards. Communications unit 610 may provide communications through the use of either or both physical and wireless communications links. Security component 111 and database 116 may be downloaded to persistent storage 608 of security server 110 through communications unit 610.

I/O interface(s) 612 allows for input and output of data with other devices that may be connected to security server 110. For example, I/O interface(s) 612 may provide a connection to external device(s) 618 such as a keyboard, a keypad, a touch screen, a microphone, a digital camera, and/or some other suitable input device. External device(s) 618 can also include portable computer readable storage media such as, for example, thumb drives, portable optical or magnetic disks, and memory cards. Software and data used to practice embodiments of the present invention, e.g., security component 111 and database 116 on security server 110, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor or the lenses of a head mounted display. Display 620 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for notification of a route deviation during travel, the method comprising:
    receiving, by one or more computer processors, a request from a passenger to monitor a travel route from a present location to a destination;
    calculating, by the one or more computer processors, a passenger route deviation from the travel route;
    comparing, by the one or more computer processors, the passenger route deviation to a predefined threshold route deviation;
    responsive to the passenger route deviation exceeding the predefined threshold route deviation, notifying, by the one or more computer processors, the passenger of a route deviation alarm;
    determining, by the one or more computer processors, if the passenger acknowledged the route deviation alarm within a predetermined time period;
    responsive to the passenger not acknowledging the route deviation alarm within the predetermined time period, notifying, by the one or more computer processors, one or more third parties of the passenger's route deviation alarm.

2. The method of claim 1, further comprising calculating, by the one or more processors, a predicted travel route, wherein calculating the predicted travel route comprises:
    receiving, by the one or more computer processors, the present location and the destination from the passenger;
    retrieving, by the one or more computer processors, external data associated with the travel route, wherein the external data comprises traffic information and weather-related information;
    retrieving, by the one or more computer processors, one or more thresholds of permissible deviation; and
    calculating, by the one or more computer processors, a predicted travel route based on the one or more thresholds of permissible deviation, the external data, the destination, and the present location.

3. The method of claim 2, wherein calculating the passenger route deviation from the travel route comprises:
    comparing, by the one or more computer processors, a current passenger travel route against the predicted travel route; and
    calculating, by the one or more computer processors, a deviated value based on the differences between the current passenger travel route and the predicted travel route.

4. The method of claim 3, wherein comparing the passenger route deviation to the predefined threshold route deviation comprises:
    comparing, by the one or more computer processors, the deviated value against the predefined threshold route deviation, wherein the predefined threshold route deviation is dynamically adjustable by the passenger.

5. The method of claim 1, wherein notifying the passenger of the route deviation alarm further comprises sending a request to a mobile device of the passenger for the acknowledgement associated with the passenger route deviation.

6. The method of claim 1, wherein determining if the passenger has acknowledged the notification within a predetermined time period comprises receiving an acknowledgment from the passenger, wherein the acknowledgment is sent from a mobile device of the passenger and is based on a sensor, wherein the sensor detects a cognitive state of the passenger.

7. The method of claim 1, wherein notifying one or more third parties of the route deviation alarm comprises:
sending, by the one or more computer processors, one or more alert messages to a predetermined one or more third party list, wherein the one or more alert messages comprise a location of the passenger, information related to the driver, and a vehicle license number.

8. The method of claim 7, wherein the predetermined one or more third party list comprises a relative of the passenger, a friend of the passenger, and a local law enforcement authority.

9. The method of claim 1, wherein the predetermined time period is dynamically adjustable by the passenger.

10. The method of claim 2, wherein the one or more thresholds of permissible deviation further comprises an increase or decrease in speed, an adverse traffic condition, an adverse weather condition, and a radius away from the predicted travel route.

11. A computer system for notification of a route deviation during travel, the computer system comprising:
one or more computer processors;
one or more computer readable storage devices; and
program instructions stored on the one or more computer readable storage devices for execution by at least one of the one or more computer processors, the stored program instructions comprising:
program instructions to receive a request from a passenger to monitor a travel route from a present location to a destination;
program instructions to calculate a passenger route deviation from the travel route;
program instructions to compare the passenger route deviation to a predefined threshold route deviation;
responsive to the passenger route deviation exceeding the predefined threshold route deviation, program instructions to notify the passenger of a route deviation alarm;
program instructions to determine if the passenger acknowledged the route deviation alarm within a predetermined time period;
responsive to the passenger not acknowledging the route deviation alarm within the predetermined time period, program instructions to notify one or more third parties of the passenger's route deviation alarm.

12. The computer system of claim 11, wherein the stored program instructions further comprise program instructions to calculate a predicted travel route, wherein the program instructions to calculate the predicted travel route comprise:
program instructions to receive the present location and the destination from the passenger;
program instructions to retrieve external data associated with the travel route, wherein the external data comprises traffic information and weather-related information;
program instructions to retrieve one or more thresholds of permissible deviation; and
program instructions to calculate a predicted travel route based on the one or more thresholds of permissible deviation, the external data, the destination and the present location.

13. The computer system of claim 12, wherein the program instructions to calculate the passenger route deviation from the travel route comprise:
program instructions to compare a current passenger travel route against the predicted travel route; and
program instructions to calculate a deviated value based on the differences between the current passenger travel route and the predicted travel route.

14. The computer system of claim 13, wherein the program instructions to compare the passenger route deviation to the predefined threshold route deviation comprise:
program instructions to compare the deviated value against the predefined threshold route deviation, wherein the predefined threshold route deviation is dynamically adjustable by the passenger.

15. The computer system of claim 11, wherein the program instructions to notify the passenger of the route deviation alarm comprise program instructions to send a request to a mobile device of the passenger for the acknowledgement associated with the passenger route deviation.

16. The computer system of claim 11, wherein the program instructions to determine if the passenger has acknowledged the notification within a predetermined time period comprise program instructions to receive the acknowledgment from the passenger, wherein the acknowledgment is sent from a mobile device of the passenger and is based on a sensor, wherein the sensor detects a cognitive state of the passenger.

17. The computer system of claim 11, wherein the program instructions to notify one or more third parties of the route deviation comprise:
program instructions to send one or more alert messages to a predetermined one or more third party list, wherein the one or more alert messages comprises a location of the passenger, information related to the driver, and a vehicle license number.

18. The computer system of claim 17, wherein the predetermined one or more third party list comprises a relative of the passenger, a friend of the passenger, and a local law enforcement authority.

19. The computer system of claim 11, wherein the predetermined time period is dynamically adjustable by the passenger.

20. A computer program product for notification of a route deviation during travel, the computer program product comprising a computer readable storage medium having stored thereon:
program instructions to receive a request from a passenger to monitor a travel route from a present location to a destination;
program instructions to calculate a passenger route deviation from the travel route;
program instructions to compare the passenger route deviation to a predefined threshold route deviation;
responsive to the passenger route deviation exceeding the predefined threshold route deviation, program instructions to notify the passenger of a route deviation alarm;
program instructions to determine if the passenger acknowledged the route deviation alarm within a predetermined time period;
responsive to the passenger not acknowledging the route deviation alarm within the predetermined time period, program instructions to notify one or more third parties of the passenger's route deviation alarm.

* * * * *

UNITED STATES PATENT AND TRADEMARK OFFICE
CERTIFICATE OF CORRECTION

PATENT NO. : 10,573,184 B1
APPLICATION NO. : 16/199292
DATED : February 25, 2020
INVENTOR(S) : Sushain Pandit et al.

Page 1 of 1

It is certified that error appears in the above-identified patent and that said Letters Patent is hereby corrected as shown below:

On the Title Page

Item (73), delete "Internatioinal" and insert --International--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*